(12) United States Patent
McDaniel et al.

(10) Patent No.: US 9,298,367 B1
(45) Date of Patent: Mar. 29, 2016

(54) RAPID NOTIFICATION LOGIN (71) Applicant: LENOVO (Singapore) PTE, LTD., New Tech Park (SG)

(72) Inventors: Kyle Jared McDaniel, Morrisville, NC (US); Jason Grimme, Cary, NC (US); Spencer Michael Guy, Raleigh, NC (US); Russell Speight VanBlon, Raleigh, NC (US)

(73) Assignee: Lenovo (Singapore) PTE. LTD, New Tech Park (SG)

( * ) Notice: Subject to any disclaimer, the term of this patent is extended or adjusted under 35 U.S.C. 154(b) by 0 days.

(21) Appl. No.: 14/605,771

(22) Filed: Jan. 26, 2015

(51) Int. Cl.
*G06K 5/00* (2006.01)
*G06F 3/0488* (2013.01)
*G06F 3/0481* (2013.01)
*G06F 3/0484* (2013.01)

(52) U.S. Cl.
CPC .......... *G06F 3/04883* (2013.01); *G06F 3/0484* (2013.01); *G06F 3/04817* (2013.01)

(58) Field of Classification Search
CPC ........... G06K 5/00; G06K 7/00; G06K 19/00; G06K 19/06; G06K 7/08; G06F 17/00
USPC ........ 235/380, 375, 487, 462.45, 439, 472.01
See application file for complete search history.

(56) References Cited

U.S. PATENT DOCUMENTS

| | | | |
|---|---|---|---|
| 2009/0058830 A1* | 3/2009 | Herz et al. | 345/173 |
| 2014/0283142 A1* | 9/2014 | Shepherd et al. | 726/30 |
| 2014/0331187 A1* | 11/2014 | Hicks et al. | 715/845 |
| 2015/0186397 A1* | 7/2015 | Cueto et al. | G06F 17/30126 |

* cited by examiner

*Primary Examiner* — Edwyn Labaze
(74) *Attorney, Agent, or Firm* — Kunzler Law Group (57) ABSTRACT

For rapid notification login, code displays a process proxy and a swipe input geometry adjacent to the process proxy on a touch screen display. In addition, the code activates a process associated with the process proxy in response to a continuous swipe over the process proxy and a preset geometry on the swipe input geometry on the touch screen display.

20 Claims, 8 Drawing Sheets

| Activation Data 205 |
| Activation Data 205 |
| Activation Data 205 |
| Activation Data 205 |
| Swipe Input Geometry Data 235 |

| Process ID 210 |
| Proxy Position 215 |
| Preset Geometry 220 |
| Access Permissions 225 |
| Proxy Image 230 |
| Swipe Input Geometry Data 235 |

RAPID NOTIFICATION LOGIN

BACKGROUND

1. Field

The subject matter disclosed herein relates to a login and more particularly relates to a rapid notification login.

2. Description of the Related Art

An electronic device frequently receives or generates notifications for a user. The electronic device must often be unlocked to receive the notifications.

BRIEF SUMMARY

An apparatus for rapid notification login is disclosed. The apparatus includes a touch screen display, a processor, and a memory. The memory stores code executable by the processor. The code displays a process proxy and a swipe input geometry adjacent to the process proxy on the touch screen display. In addition, the code activates a process associated with the process proxy in response to a continuous swipe over the process proxy and a preset geometry on the swipe input geometry on the touch screen display. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
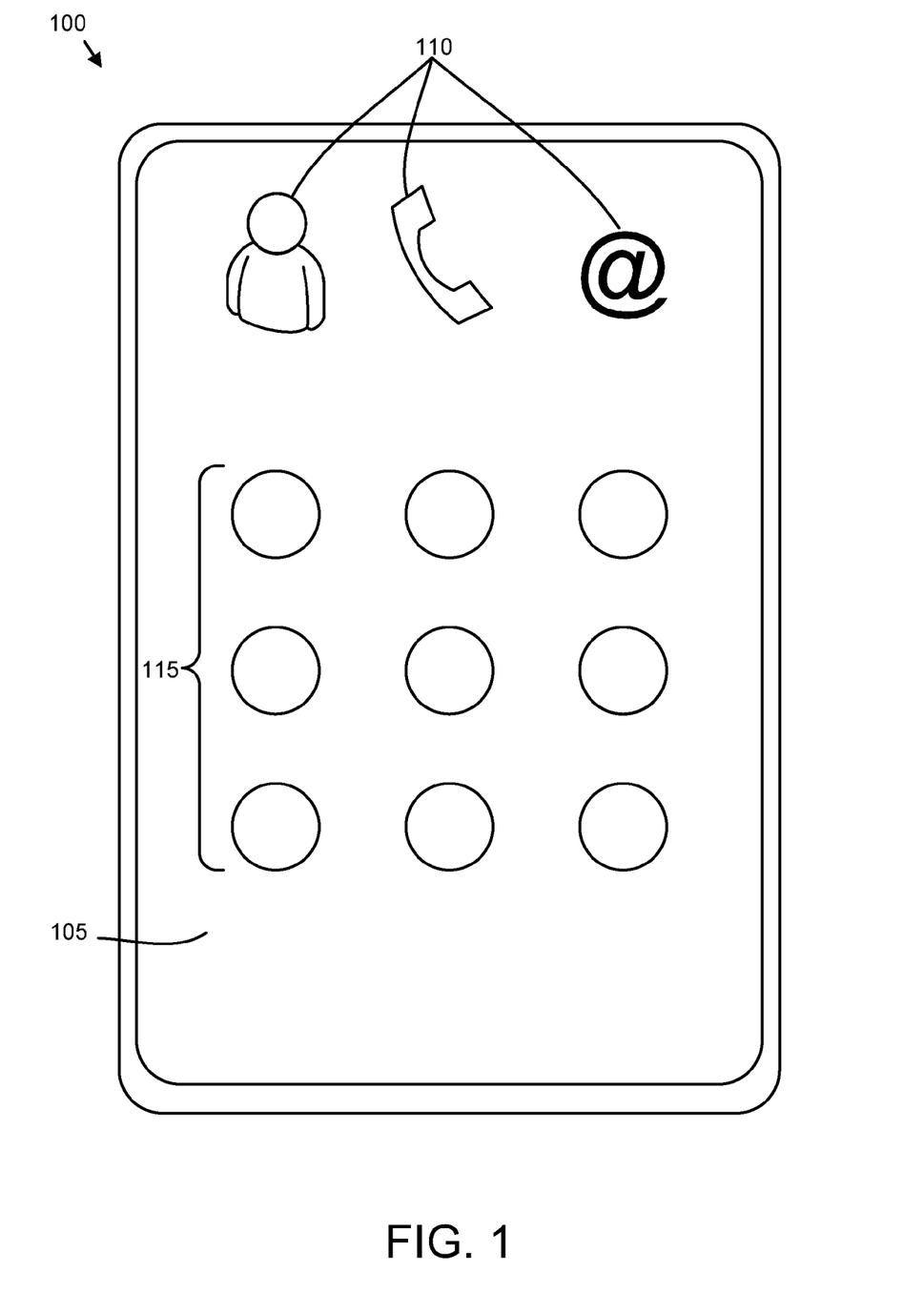
FIG. 1 is a front view drawing illustrating one embodiment of an electronic device.

FIG. 1 is a front view drawing illustrating one embodiment of an electronic device 100. The electronic device 100 may be a mobile telephone, a tablet computer, a laptop computer, computer workstation, or the like. The electronic device 100 includes a touch screen display 105.

Access to the electronic device 100 may be locked in order to prevent unauthorized use. For example, the user may be unable to activate functions of the electronic device 100, receive notifications, and the like without first logging on to the electronic device 100. Unfortunately, logging into the electronic device 100 may be time-consuming.

The embodiments described herein provide a rapid notification login that allows a user to quickly access notifications on the electronic device 100. The embodiments display one or more process proxies 110 and a swipe input geometry 115 adjacent to the process proxy 110. The process proxies 110 may represent a process such as an application, a notification type, a notification or the like. A process proxy 110 may be displayed as an icon. Alternatively, a process proxy may display full or partial text of a notification. The process proxy 110 may also comprise a user selected image. In addition, the embodiments activate a process associated with the process proxy 110 in response to a swipe over the process proxy 110 and a preset geometry on the swipe input geometry 115 as will be described hereafter.

In one embodiment, the process proxies 110 represent a process such as an application that generates a notification. Alternatively, the process proxies 110 may represent a notification type. For example, a process proxy 110 may represent a specified individual, a customer organization, an invitation, a type of social media, a type of message, or the like. Each process proxy 110 may be customizable by the user.

The swipe input geometry 115 may be a pattern of geometric shapes. In the depicted embodiment, the swipe input geometry 115 is a grid of circles. Other geometric shapes and other patterns of the geometric shapes may be employed.

Alternatively, the swipe input geometry 115 may be an image. For example, the swipe input geometry 115 may be a photograph, an illustration, or the like. In a certain embodiment, one or more images are arranged in a pattern. In one embodiment, the swipe input geometry 115 may include one or more alphanumeric characters. The alphanumeric characters may be arranged in a pattern.

The process proxy 110 may be a notification icon that indicates that a notification has been received. The process may be the notification. Alternatively, the process proxy 110 may be an incoming communication icon that indicates that a communication and/or message has been received by a process. In one embodiment, the process is a communication application.

A user may execute the rapid notification login by making a swipe such as a continuous swipe over the process proxy 110. In addition, the swipe may form a preset geometry on the swipe input geometry 115. If the swipe includes both the process proxy 110 and the preset geometry on the swipe input geometry 115, the embodiments may activate the process associated with the process proxy 110 as will be described hereafter. However, if the swipe does not include both the process proxy 110 and the preset geometry on the swipe input geometry 115, the process is not activated.

Figure 2A:
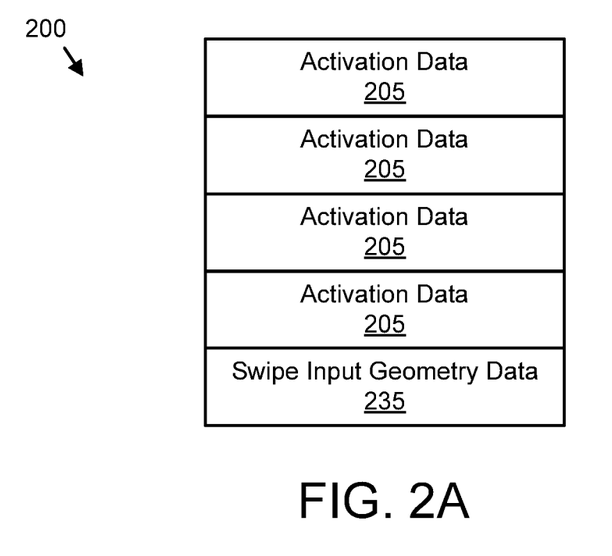
FIG. 2A is a schematic block diagram illustrating one embodiment of an activation database.

FIG. 2A is a schematic block diagram illustrating one embodiment of an activation database 200. The activation database 200 may store activation data 205 for one or more processes. The activation database 200 maybe organized as a data structure that is stored on a memory. In the depicted embodiment, the activation database 200 includes activation data 205, and swipe input geometry data 235.

The activation data 205 stores parameters for employing the rapid notification login for a specified process. The activation data 205 is stored in more detail in FIG. 2B. The swipe input geometry data 235 may specify the swipe input geometry 115. For example, the swipe input geometry data 235 may specify a pattern of geometric shapes, an image, a pattern of images, a pattern of alphanumeric characters, or the like. In one embodiment, the swipe input geometry data 235 generates a global swipe input geometry 115 for all processes without specified swipe input geometry data 235.

Figure 2B:
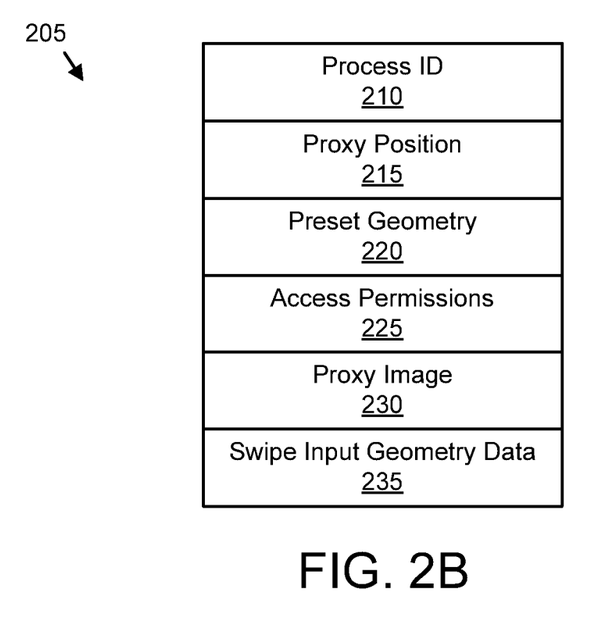
FIG. 2B is a schematic block diagram illustrating one embodiment of activation data.

FIG. 2B is a schematic block diagram illustrating one embodiment of the activation data 205. The activation data 205 may specify parameters for implementing the rapid notification login for a specified process. The activation data 205 maybe organized as a data structure that is stored on the memory. In the depicted embodiment, the activation data 205 includes a process identifier 210, an proxy position 215, a preset geometry 220, access permissions 225, an proxy image 230, and the swipe input geometry data 235.

The process identifier 210 may identify the specified process associated with the process proxy 110. The process identifier 210 may include a link to the specified process, a description of the specified process, and the like.

The proxy position 215 may specify a position of the process proxy 110 on the touch screen display 105. In one embodiment, the proxy position 215 is an absolute position on the touch screen display 105. Alternatively, the proxy position 215 describes a relative position of the process proxy 110 within a graphical user interface (GUI) element such as a box window.

The preset geometry 220 may specify how a swipe must pass over the process proxy 110 and the swipe input geometry 115 in order to login and activate the process. In one embodiment, the preset geometry 220 specifies that the swipe is a continuous swipe. For example, the preset geometry 220 may specify that the swipe move directly over the touch screen display between the process proxy 110 and a first portion of the preset geometry 220. Alternatively, the preset geometry 220 may specify that the swipe move directly over the touch screen display between a last portion of the preset geometry 220 and the process proxy 110.

In addition, the preset geometry 220 may specify that the continuous swipe is first over the process proxy 110 and second over the swipe input geometry 115. Alternatively, the preset geometry 220 may specify the continuous swipe is first over the swipe input geometry 115 and second over the process proxy 110.

The preset geometry 220 may specify that the swipe pass over portions of the swipe input geometry 115 in a specified order. For example, the preset geometry 220 may specify that the swipe pass in order over a bridge, the sun, and a sailboat in an image. Alternatively, the preset geometry 220 may specify that the swipe pass over a pattern of geometric shapes in a specified order. In one embodiment, the preset geometry 220 specifies an order of alphanumeric characters. For example, the preset geometry 220 may specify that the alphanumeric characters "O," "P," "E," and "N" be passed over by the swipe.

The access permissions 225 may specify the functions of the electronic device 100 that may be accessed in response to activating the process. In one embodiment, the access permissions 225 include full access, process access, and notification access. A user may specify the access permissions 225 for each process.

The full access may allow access to all functions of the electronic device 100. In a certain embodiment, the full access may allow access to all functions of the electronic device 100 subject to application-specific restrictions.

The process access may allow access to the process associated with the process proxy 110. For example, if the electronic device 100 receives a text message notification, the user swipe across a process proxy 110 for a text message application and swipe the preset geometry 220 on the swipe input geometry 115 to access the text message application. However, the user may be unable to access other functions of the electronic device 100.

The notification access may only allow access to a notification, without access to other functions of the electronic device 100 and the process associated with the notification. Continuing the example above, when the electronic device 100 receives the text message notification and the user activates the process using the swipe, the user may only be able to access the text message. The user may be unable to employ other functions of the text message application and/or the electronic device 100.

The proxy image 230 may be used to generate the process proxy 110. The proxy image 230 may be an illustration, an image, a photograph, alphanumeric characters, or the like.

The swipe input geometry data 235 may specify the swipe input geometry 115 for the process. For example, a text message application may have a first unique swipe input geometry 115 while an email application has a second unique swipe input geometry 115. In addition, system notifications may employ a global swipe input geometry 115 specified by the swipe input geometry data 235 of FIG. 2A.

Figure 3A:
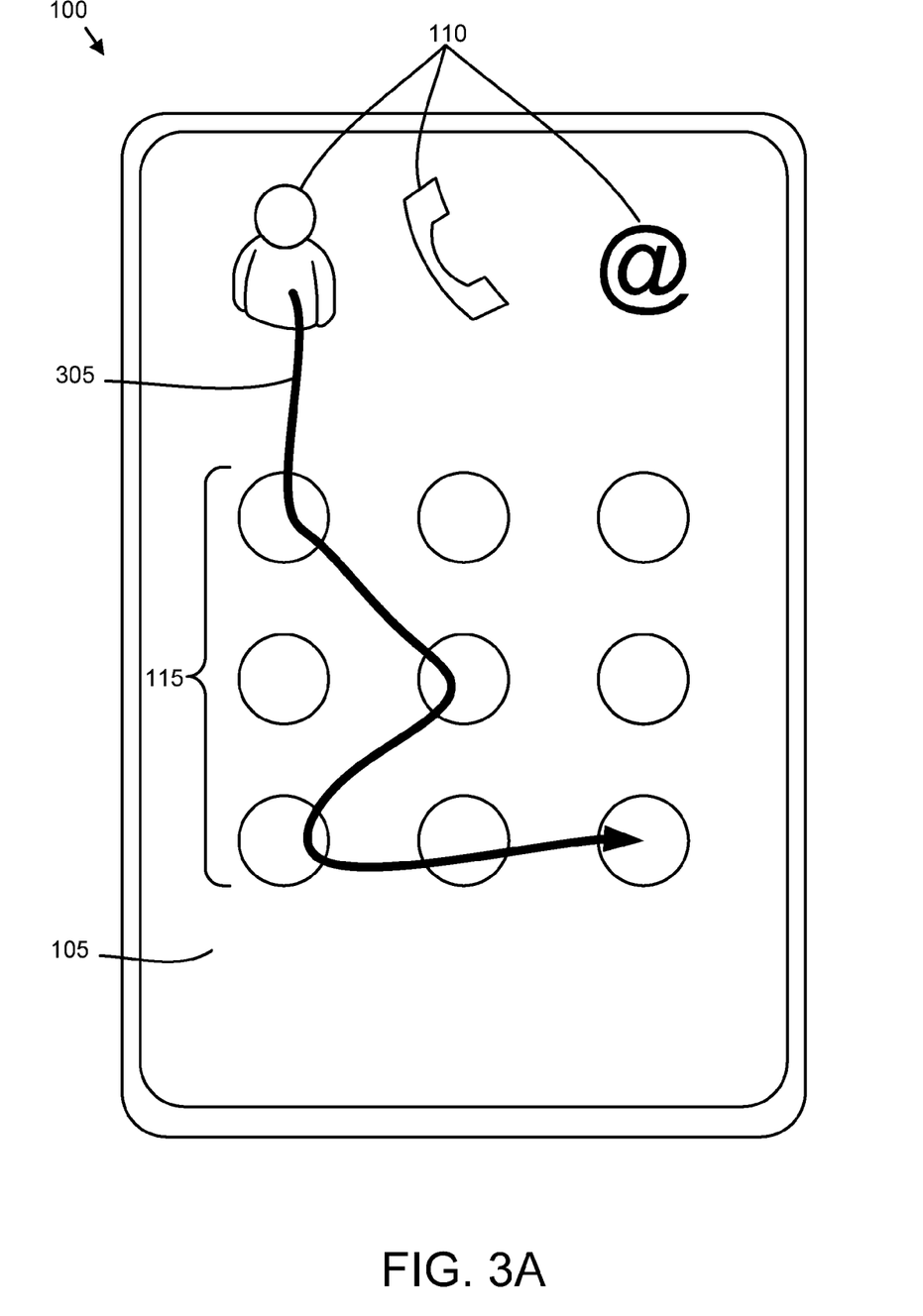
FIG. 3A is a front view drawing illustrating one embodiment of a swipe on the electronic device.

FIG. 3A is a front view drawing illustrating one embodiment of a swipe 305 on the electronic device 100. The swipe 305 may be made by an input object such as a finger, a stylus, or a cursor driven by an input device. The swipe 305 may be on the touch screen display 105. The swipe 305 may be a continuous swipe 305, wherein the input object maintains contact with the touch screen display 105. In the depicted embodiment, the continuous swipe 305 passes first over the process proxy 110 and second over the swipe input geometry 115. The swipe 305 moves directly between the process proxy 110 and the swipe input geometry 115. While passing over the swipe input geometry 115, the swipe 305 forms the preset geometry 220 to activate the process associated with the process proxy 110.

Figure 3B:
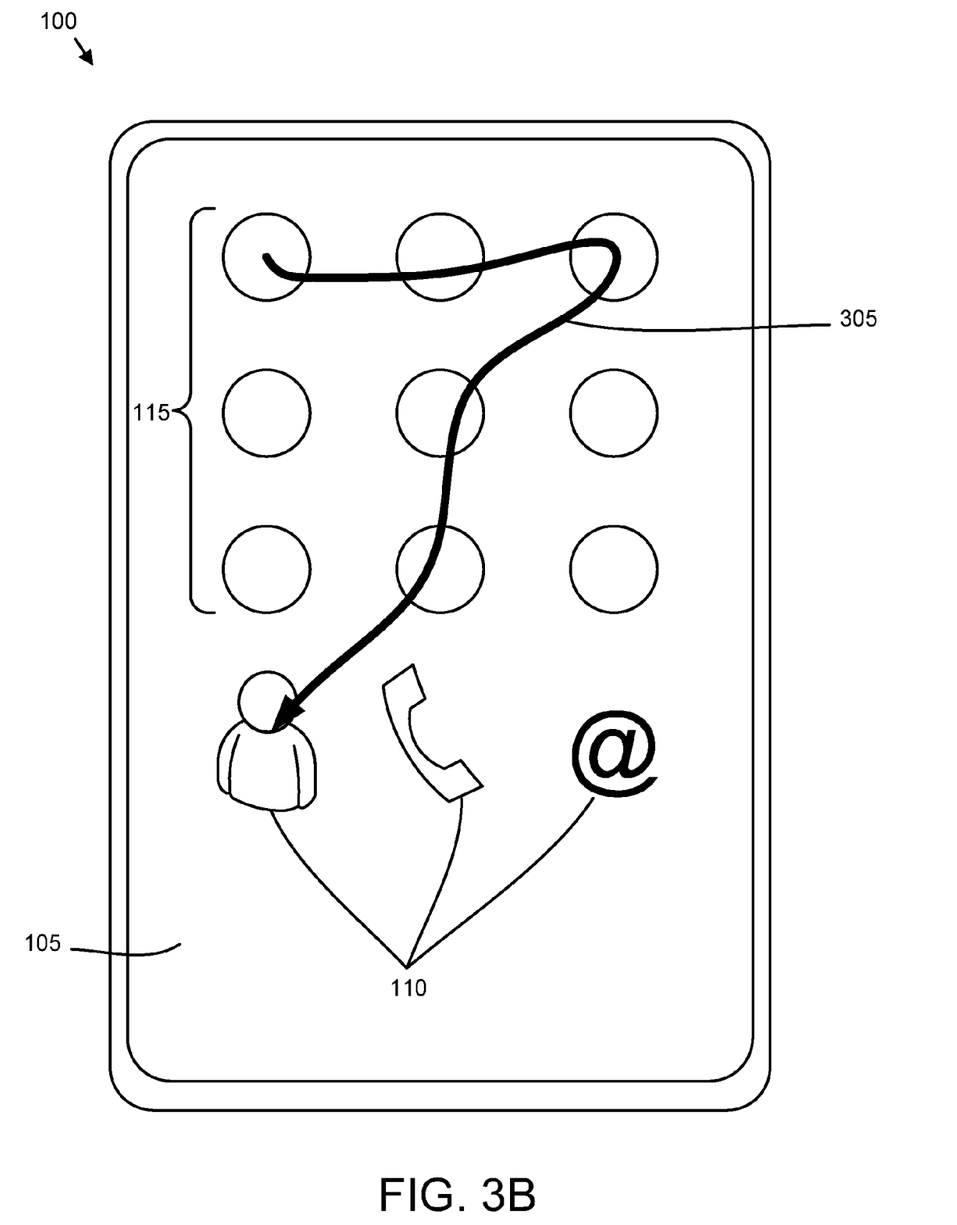
FIG. 3B is a front view drawing illustrating one alternate embodiment of a swipe on the electronic device.

FIG. 3B is a front view drawing illustrating one alternate embodiment of a swipe 305 on the electronic device 100. In the depicted embodiment, the swipe 305 is first over the swipe input geometry 115 and second over the process proxy 110.

Figure 4:
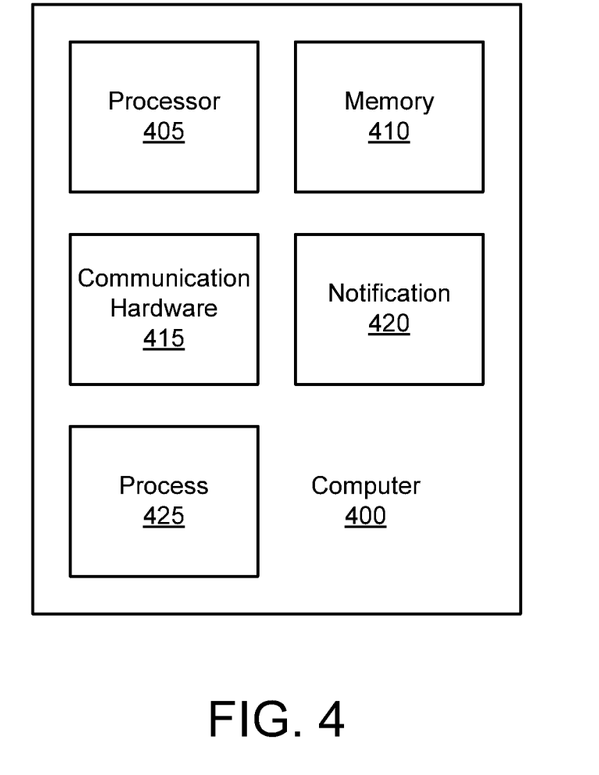
FIG. 4 is a schematic block diagram illustrating one embodiment of a computer.

FIG. 4 is a schematic block diagram illustrating one embodiment of a computer 400. The computer 400 may be embodied in the electronic device 100. Alternatively, the computer 400 may be embodied in a server in communication with the electronic device 100. The computer 400 includes a processor 405, a memory 410, and communication hardware 415. The memory 410 may be a semiconductor storage device, a hard disk drive, an optical storage device, a micromechanical storage device, or combinations thereof. The memory 410 may store code. The processor 405 may execute the code. The communication hardware 415 may communicate with other devices and/or the touch screen display 105.

In one embodiment, the communication hardware 415 receives a notification 420. For example, the notification 420 may be an email message, text message, an application-specific message, or the like. Alternatively, the processor 405 may generate the notification 420. For example, the notification 420 may be a low-power warning, an alarm, or the like. The code may include a process 425 associated with the notification 420.

Figure 5A:
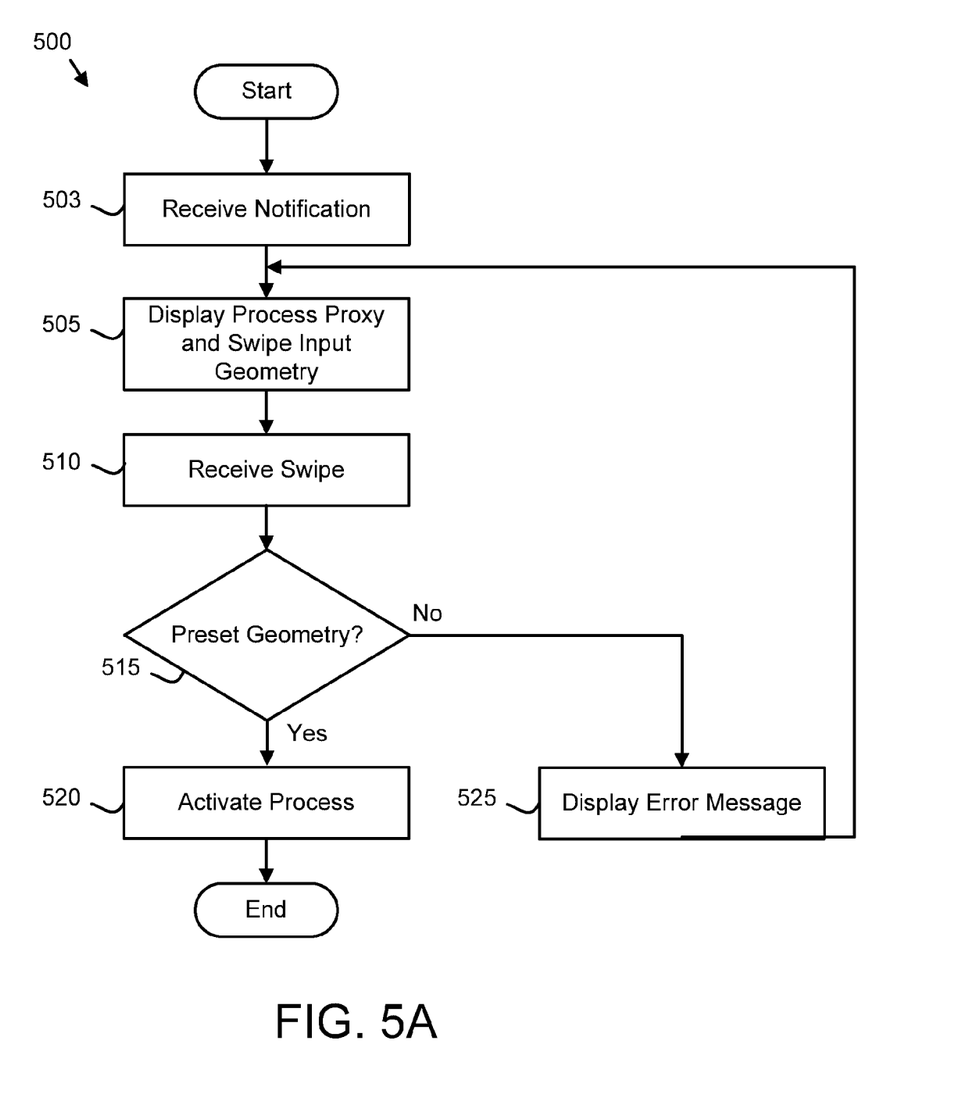
FIG. 5A is a schematic flow chart diagram illustrating one embodiment of a rapid notification login method.
Figure 5B:
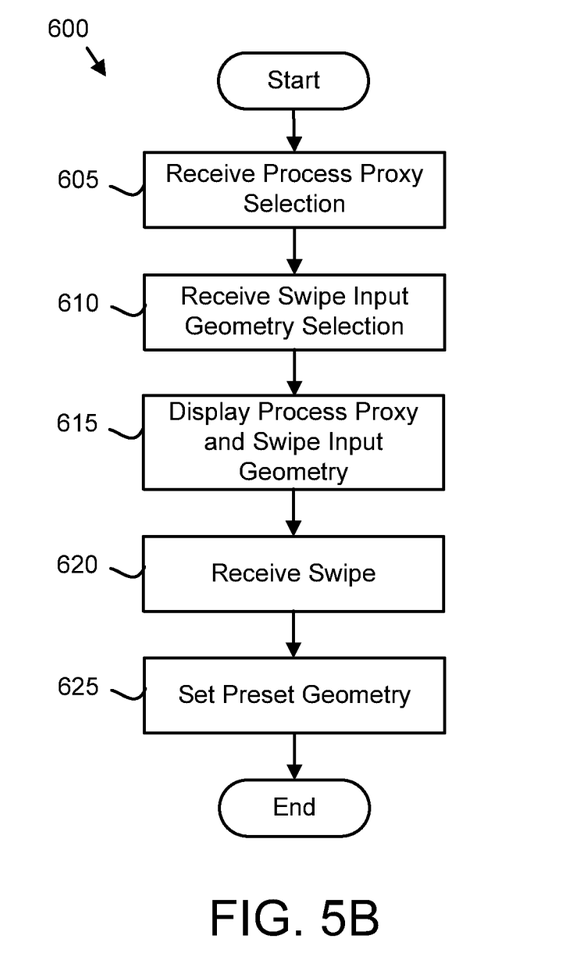

FIG. 5A is a schematic flow chart diagram illustrating one embodiment of a rapid notification login method 500. The method 500 may allow a user to rapidly login to the electronic device 100 in response to a notification. The method 500 may be performed by the processor 405. Alternatively, the method 500 may be performed by a computer readable storage medium such as the memory 410. The computer readable storage medium may store code executable by the processor 405 to perform the functions of the method 500.

The method 500 starts, and in one embodiment, the code receives 503 a notification 420. The notification 420 may be received 503 as a communication to the electronic device 100. Alternatively, the notification 420 may be received 503 from a process 425 of the electronic device 100. The notification 420 may be associated with a specific process 425. The process 425 may be an application or a specific function of an application. For example, the process 425 may be a weather alert function of a weather process 425. Alternatively, the process 425 may be the weather process 425.

In one embodiment, the code displays 505 the process proxy 110 and the swipe input geometry 115. The process proxy 110 in the swipe input geometry 115 may be displayed 505 in response to the notification 420. In one embodiment, the process proxy 110 is displayed 505 as the proxy image 230 at the proxy position 215. In addition, the swipe input geometry 115 may be displayed 505 as specified by the global swipe input geometry data 235 of the activation database 200. Alternatively, the swipe input geometry 115 may be displayed 505 as specified by the process specific swipe input geometry data 235 of the activation data 205 for the process 425.

The code further receives 510 the swipe 305 on the touch screen display 105. The swipe 305 may be a continuous swipe 305. The continuous swipe 305 may move directly over the touch screen display 105 between the process proxy 110 and the swipe input geometry 115. In addition, the continuous swipe 305 may form all of the preset geometry 220 while maintaining contact between the input object and the touch screen display 105.

The swipe 305 both passes over the process proxy 110 and forms the preset geometry 220 on the swipe input geometry 115. If the swipe 305 does not pass over the process proxy 110, the code will not activate the process. Similarly, if the swipe 305 does not form the preset geometry 220 on the swipe input geometry 115, the code will not activate the process.

The code further determines 515 if the swipe 305 includes the process proxy 110 and forms the preset geometry 220 on the swipe input geometry 115 associated with the process proxy 110 and the process 425. In one embodiment, the preset geometry 220 includes one or more waypoints in a specified order. The swipe 305 may pass within a specified distance of each waypoint in the specified order for the swipe 305 to form the preset geometry 220.

Alternatively, the preset geometry 220 may include a preset path through the swipe input geometry 115. A swipe path for the swipe 305 may be determined by calculating a difference between the preset path and the swipe path. If the difference is less than a match threshold, the swipe 305 may form the preset geometry 220.

If the swipe 305 does not form the preset geometry 220 or does not include the process proxy 110, the code may display 525 an error message and again display 505 the process proxy 110 and the swipe input geometry 115. If the swipe 305 does form the preset geometry 220 and include the process proxy 110, the code may activate 520 the process 425 and the method 500 ends.

For example, the process proxy 110 may be an incoming communication icon that represents an incoming text message for a text message application. In response to determining 515 that the swipe 305 matches the preset geometry 220 and passes over the process proxy 110, the code may activate 520 the text message application and display the text message.

In one embodiment, the code activates 520 the process 425 subject to the access permissions 225. For example, if the access permissions 225 allow full access, the code may activate 520 the process 425 with full access to the electronic device. Alternatively, if the access permissions 225 allow process access, the code may activate 520 the process 425 without access to other features of the electronic device 100. In addition, if the code activates 520 to process 425 with notification access, the user may only retrieve a notification from the process 425 without access to other features of the process 425.

Figure 6:
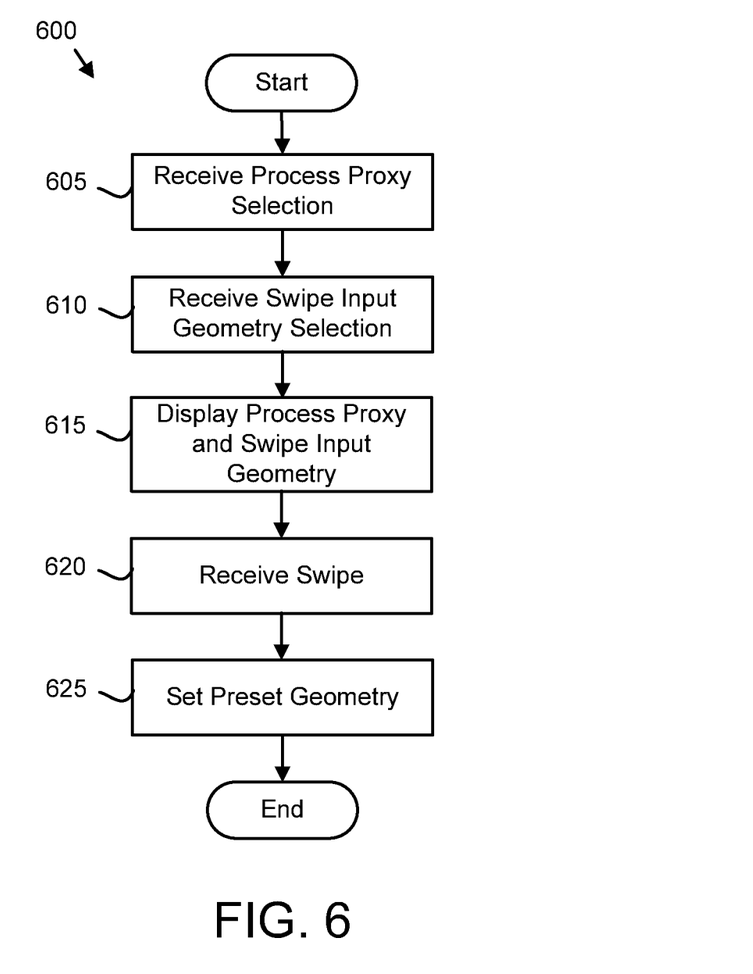
FIG. 6 is a schematic flow chart diagram illustrating one embodiment of a preset geometry setting method.

FIG. 6 is a schematic flow chart diagram illustrating one embodiment of a preset geometry setting method 600. The method 600 may set the preset geometry 220 for a specified process. The method 600 may be performed by the processor 405. Alternatively, the method 600 may be performed by a computer readable storage medium such as the memory 410. The computer readable storage medium may store code executable by the processor 405 to perform the functions of the method 600.

The method 600 starts, and in one embodiment, the code receives 605 a process proxy 110 selection. For example, the user may select the process proxy 110 from a list of candidate process proxies 110. Alternatively, the user may designate an image for the process proxy 110. The selected process proxy 110 may be stored as the proxy image 230.

In addition, the code may receive 610 a swipe input geometry 115 selection. For example, a user may select one or more of geometric shapes, alphanumeric characters, images, and the like for the swipe input geometry 115. The user may also select a pattern of geometric shapes, alphanumeric characters, and/or images. For example, the user may select an image for the swipe input geometry 115. Alternatively, the user may arrange a pattern of alphanumeric characters for the swipe input geometry 115. In addition, the user may arrange a pattern of diverse geometric shapes for the swipe input geometry 115. The swipe input geometry 115 may also be relocatable on the touch screen display 105.

in one embodiment, the code displays 615 the process proxy 110 and the swipe input geometry 115 for the specified process 425. In one embodiment, the process proxy 110 may be relocatable. For example, a user may position the process proxy 110 relative to the swipe input geometry 115. Alternatively, the user may position the process proxy 110 relative to the touch screen display 105.

The code may receive 620 the swipe 305. The swipe 305 may be a continuous swipe 305. The swipe 305 passes over the process proxy 110 and forms the preset geometry 220 on the swipe input geometry 115. In one embodiment, the user must repeat the swipe 305 in order for the swipe to be received 620 by the code.

The code may further set 625 the preset geometry 220 and the method 600 ends. In one embodiment, the code stores the preset geometry 220 in the activation data 205. The preset geometry 220 is then compared against future swipes 305 in order to determine whether to activate the process 425.

The embodiments activate a process 425 associated with the process proxy 110 in response to a swipe 305 over the process proxy 110 and a preset geometry 220 on the swipe input geometry 115. As a result, a user may rapidly login to the electronic device 100 in order to activate the process 425. The activation may be limited to receiving a notification of the process 425, and may prevent the user from accessing other functions of the electronic device 100. As a result, the user may rapidly login to activate the process or receive the process notification without compromising other functions of the electronic device 100 with the rapid login as the other functions are still only accessible after a standard login.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a touch screen display;
   a processor;
   a memory that stores code executable by the processor to display a process proxy and a swipe input geometry adjacent to the process proxy on the touch screen display; and
   activate a process associated with the process proxy in response to a continuous swipe over both the process proxy and a preset geometry on the swipe input geometry on the touch screen display and does not activate the process in response to the continuous swipe moving over the swipe input geometry and not moving directly over the touch screen display between the process proxy and the swipe input geometry.

2. The apparatus of claim 1, wherein the continuous swipe is first over the process proxy and second over the swipe input geometry.

3. The apparatus of claim 1, wherein the continuous swipe is first over the swipe input geometry and second over the process proxy.

4. The apparatus of claim 1, wherein the preset geometry is selected from the group consisting of a pattern, an image, and one or more alphanumeric characters.

5. The apparatus of claim 1, wherein the memory further comprises code executable by the processor to set the preset geometry by receiving the continuous swipe over the process proxy and the swipe input geometry on the touch screen display.

6. The apparatus of claim 1, wherein the continuous swipe moves directly over the touch screen display between the process proxy and the swipe input geometry.

7. The apparatus of claim 1, wherein the process proxy is a notification icon and the process is a notification.

8. The apparatus of claim 1, wherein the process proxy is an incoming communication icon and the process is a communication application.

9. A method comprising:
   displaying, by use of a processor, a process proxy and a swipe input geometry adjacent to the process proxy on a touch screen display; and
   activating a process associated with the process proxy in response to a continuous swipe over both the process proxy and a preset geometry on the swipe input geometry on the touch screen display and does not activate the process in response to the continuous swipe moving over the swipe input geometry and not moving directly over the touch screen display between the process proxy and the swipe input geometry.

10. The method of claim 9, wherein the continuous swipe is first over the process proxy and second over the swipe input geometry.

11. The method of claim 9, wherein the continuous swipe is first over the swipe input geometry and second over the process proxy.

12. The method of claim 9, wherein the preset geometry is selected from the group consisting of an image, a picture, and one or more alphanumeric characters.

13. The method of claim 9, the method further comprising setting the preset geometry by receiving the continuous swipe over the process proxy and the swipe input geometry on the touch screen display.

14. The method of claim 9, wherein the continuous swipe moves directly over the touch screen display between the process proxy and the swipe input geometry.

15. A program product comprising a non-transitory computer readable storage medium that stores code executable by a processor, the executable code comprising code to perform:
   displaying a process proxy and a swipe input geometry adjacent to the process proxy on a touch screen display; and
   activating a process associated with the process proxy in response to a continuous swipe over both the process proxy and a preset geometry on the swipe input geometry on the touch screen display and does not activate the process in response to the continuous swipe moving over the swipe input geometry and not moving directly over the touch screen display between the process proxy and the swipe input geometry.

16. The program product of claim 15, wherein the continuous swipe is first over the process proxy and second over the swipe input geometry.

17. The program product of claim 15, wherein the continuous swipe is first over the swipe input geometry and second over the process proxy.

18. The program product of claim 15, wherein the preset geometry is selected from the group consisting of a pattern, a picture, and one or more alphanumeric characters.

19. The program product of claim 15, the code further setting the preset geometry by receiving the continuous swipe over the process proxy and the swipe input geometry on the touch screen display.

20. The program product of claim 15, wherein the continuous swipe moves directly over the touch screen display between the process proxy and the swipe input geometry.

\* \* \* \* \*